J. L. GJERSETH.
GIP CUTTING MACHINE.
APPLICATION FILED JULY 19, 1921.
1,409,943.
Patented Mar. 21, 1922.
2 SHEETS—SHEET 1.
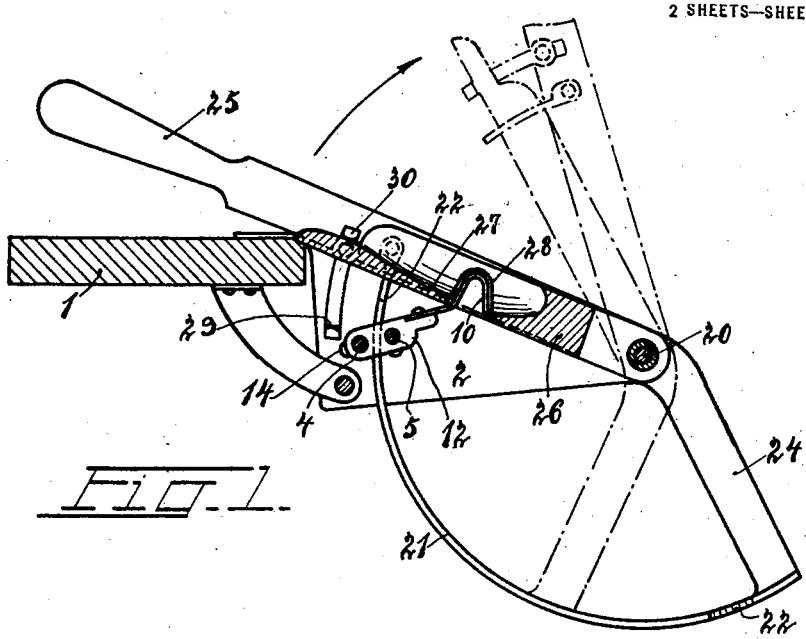
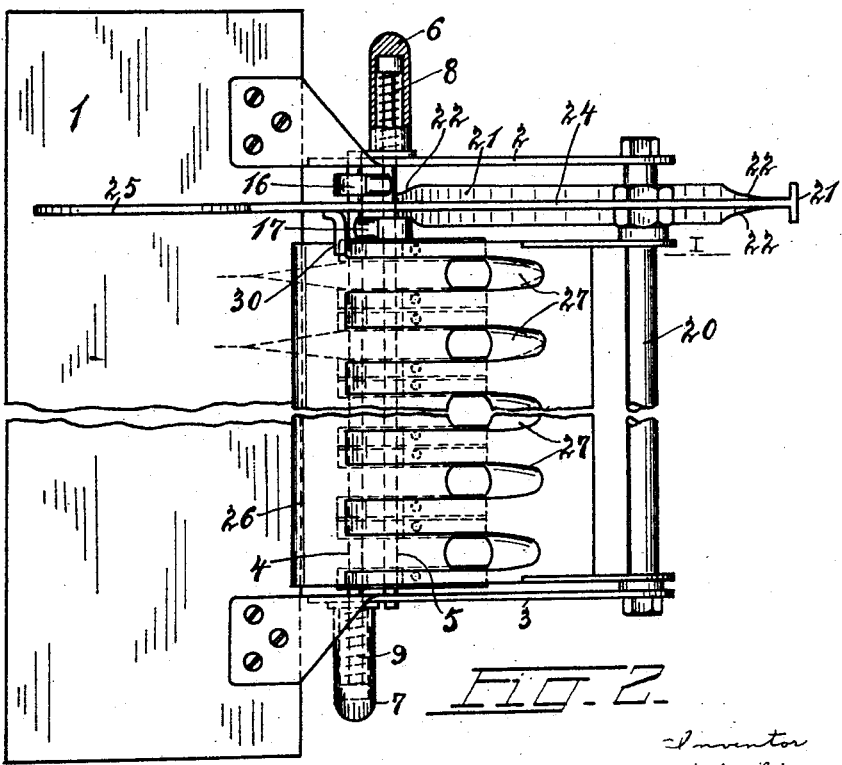

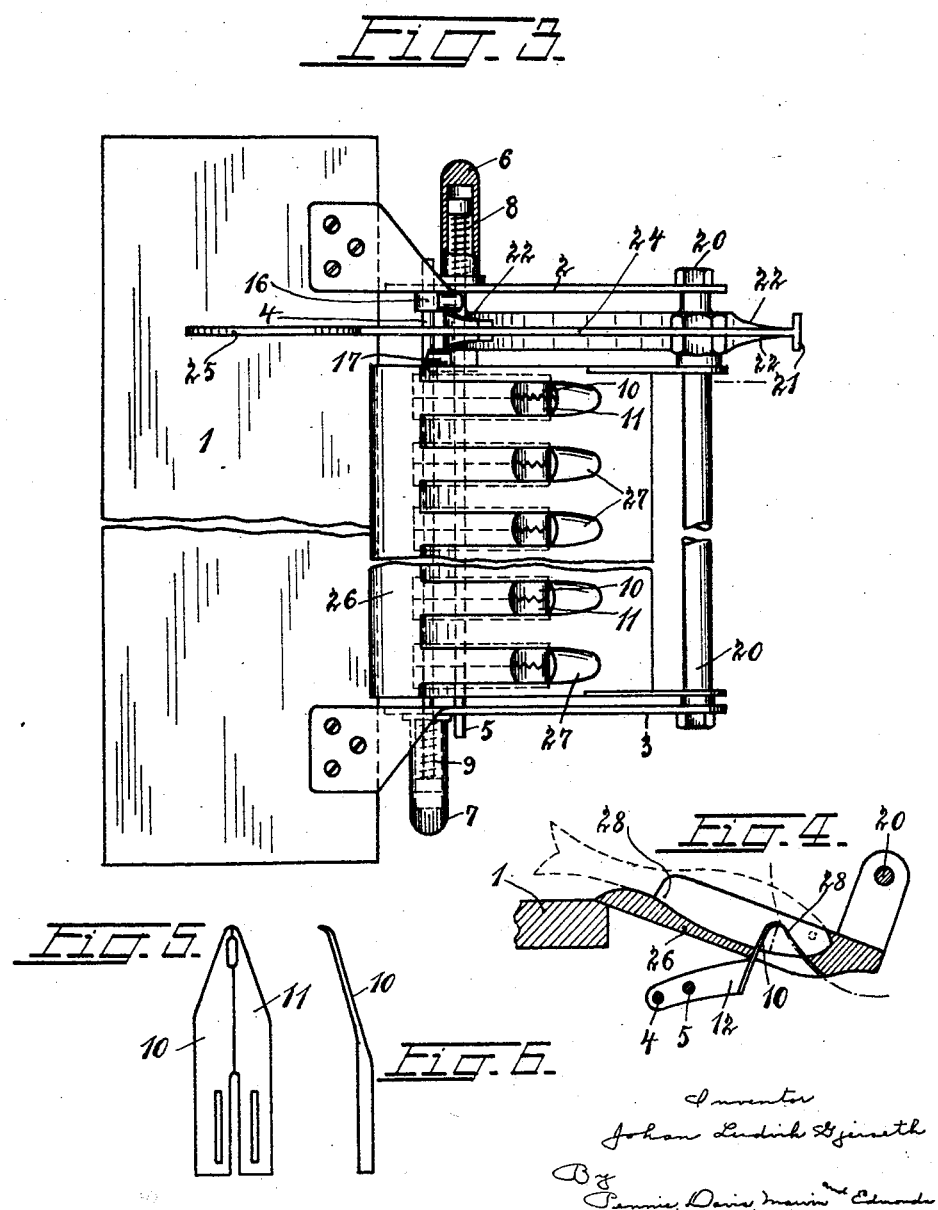

UNITED STATES PATENT OFFICE.

JOHAN LUDVIK GJERSETH, OF AALESUND, NORWAY, ASSIGNOR OF ONE-HALF TO ELIAS ROALD, OF AALESUND, NORWAY.

GIP-CUTTING MACHINE.

1,409,943.  Specification of Letters Patent.  Patented Mar. 21, 1922.

Application filed July 19, 1921. Serial No. 485,803.

*To all whom it may concern:*

Be it known that I, JOHAN LUDVIK GJERSETH, a subject of the King of Norway, residing at Aalesund, Norway, have invented certain new and useful Improvements in a Gip-Cutting Machine; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object a gipping or gip cutting machine for fish, particularly herring, and comprises a number of co-operating cutting devices mounted on parallel rods adapted to be moved in opposite directions, said cutting devices acting through cross-gaps in a table provided with longitudinal grooves serving to take up the fish with head forwards and gill downwards, so that the gill of the fish corresponds with the said gaps, and can be reached by the cutting devices operating below the table.

On the drawing Fig. 1 is a side view with section on the line I—I on Fig. 2 of a form of the apparatus.

Figs. 2 and 3 show plans of the machine in two different positions.

Fig. 4 is a detail sectional view similar to Fig. 1 illustrating a modification.

Fig. 5 is a front view of the cutter in this modification on an enlarged scale, and Fig. 6 is a side view of the modification shown in Fig. 5.

On a table 1 there are mounted arms 2, 3 which serve to carry axially slidable rods 4, 5, the free ends of which are enclosed in caps 6, 7 provided with springs 8, 9, said springs acting upon said rods for holding the same in their normal position.

On the said rods there is mounted co-operating cutting devices 10, 11, which may be provided with teeth and which are so formed that they cut out the gill of the fish and grip the gills when they are moved towards the same from opposite directions. The cutters proper are mounted on holders 12 provided with holes for taking up rods 4, 5 serving as guides for the holders, the said holders being provided with screws 14 for fastening the same alternately to rod 5 and rod 4. The ends of the rods 4, 5 are provided with adjustable stops 16, 17, engaging a curved member 21 adapted to pivot on a shaft 20 and provided with a cam surface 22 at each end, said cam surface co-operating with collars 16, 17 on rods 4, 5 in such a manner that the rods are displaced axially whereby the cutting devices are actuated so as to be first pressed together and then released during the further movement of member 21; for letting the cut out gip with gill and abdomen drop down.

The curved member 21 is connected to an arm 24 provided with handle 25 and serving to turn the same. On the same shaft 20 there is mounted a pivoted table 26 provided with longitudinal slots 27 in which the fish (herring) is so placed that the heads are turned forwards with the gip down, so that the latter is engaged by the cutting devices operating through the notches 28 extending across the grooves 27. During the cutting operation the arm 24 is pulled upwards and after the cutting devices have gripped the gip and gill of the fish table 26 is pivoted with the fish lying thereon, the arm 24 being provided on one side with a hook 29 serving to engage the table when the the handle 25 has been moved a certain distance. The lever 24 with table 26 continues its movement thus removing the fish from the cutting devices, the latter retaining the gip with gill and abdomen, extracting the same completely, whereupon the fish slips out of the grooves 27, and the cutting devices are released letting the extracted parts drop. During the backward movements of lever 24 the table is replaced by means of a hook 30 on one side of the lever.

According to Fig. 4 the shaft 20 is arranged in a higher position in relation to the table 26, whereby the cutters 10, 11 (constructed as shown in Figs. 5 and 6) describe the dotted arc relatively to the fish head so as to strip out the gills together with the stomach when the table 26 is swung upwards.

What I claim is:

1. In a gip cutting machine for fish, particularly herring, the combination with a pivoted table provided with grooves perpendicular on the axis of its pivot for taking up the fish, and gaps or notches cutting across said grooves on the underside of the table of a cutting mechanism comprising two co-operating cutters adapted to engage from opposite sides of the gip of the fish reposing in said grooves through the said gaps or slots across the grooves with the object of cutting the gip and gripping the gills of the fish.

2. In a gip cutting machine for fish, particularly herring, the combination with a pivoted table provided with grooves perpendicular on the axis of its pivot for taking up the fish, and gaps or notches cutting across said grooves on the underside of the table of a cutting mechanism comprising two spring actuated parallel rods provided with laterally extending cutters secured alternately to each of the two rods, said rods being adapted to be displaced axially in opposite directions in order to operate the cutters and make them engage from opposite sides the gip of the fish reposing in said grooves through the said gaps or slots across the grooves with the object of cutting the gip and gripping the gills of the fish.

3. In a gip cutting machine for fish, particularly herring, the combination with a pivoted table provided with grooves perpendicular on the axis of its pivot for taking up the fish, and gaps or notches cutting across said grooves on the underside of the table of a cutting mechanism comprising two spring actuated parallel rods provided with laterally extending cutters secured alternately to each of the two rods, said rods being adapted to be displaced axially in opposite directions by means of curved cams engaging collars on the said rods, said cams being operated by means of a pivoted handle in order to operate the cutters and make them engage from opposite sides the gip of the fish reposing in said grooves through the said gaps or slots across the grooves with the object of cutting the gip and gripping the gills of the fish.

4. In a gip cutting machine for fish, particularly herring, the combination with a pivoted table provided with grooves perpendicular on the axis of its pivot for taking up the fish, and gaps or notches cutting across said grooves of the underside of the table of a cutting mechanism operated for cutting the gip by means of a pivoted handle, said handle serving also to pivot the said table in order to remove the same from the cutters when the gip of the fish has been cut thereby and tilt the table so that the fish slips out of the grooves.

In testimony that I claim the foregoing as my invention, I have signed my name in presence of two subscribing witnesses.

JOHAN LUDVIK GJERSETH.

Witnesses:
SEVERIN ROALD,
SIGURD JACOBSEN.